Dec. 6, 1955 T. W. MULLEN 2,725,666
RODENTICIDE DISPENSER
Original Filed Feb. 2, 1952

INVENTOR
Thomas W. Mullen,
By Herbert A. Minturn,
Attorney

United States Patent Office 2,725,666
Patented Dec. 6, 1955

2,725,666

RODENTICIDE DISPENSER

Thomas W. Mullen, Evansville, Ind.

Original application February 2, 1952, Serial No. 269,635, now Patent No. 2,690,028, dated September 28, 1954. Divided and this application August 3, 1954, Serial No. 447,494

8 Claims. (Cl. 43—131)

This application is a division from my application for U. S. Letters Patent filed February 2, 1952, Serial No. 269,635 now issued as U. S. Patent No. 2,690,028 as of September 28, 1954.

This invention relates to a device for dispensing a "flowable" dry state of bait, either in a granulated or meal form. The primary purpose of the invention is to provide a dispenser which will not deter but which will be inviting to mice particularly although it may be used equally as well on a larger scale for rats. A still further primary purpose of the invention is to provide a dispenser which when overturned will not spill out any of the bait to make it available for animals not intended to reach the bait. The bait is only available by the animals entering the dispenser for feeding on the bait.

While different kinds of rat and mice killing baits may be employed, the structure is primarily intended to dispense bait in which is incorporated the chemical 3-(alpha-acetonylbenzyl)-4-hydroxycoumarin. This is the chemical which is being sold under the trademark "Warfarin," as originated by the Wisconsin Alumni Research Foundation, and is more fully described in the U. S. Letters Patent No. 2,427,878, issued September 16, 1947.

A peculiar characteristic of the bait containing the above indicated chemical is that the animals eating the bait containing that chemical do not die at once, and neither do they die directly from poisoning by use of that chemical. To the contrary, the animals will have to return again and again to the bait to be carried by the dispenser before any appreciable effect is had upon them. In fact, the chemical kills the rats and mice by changing the clotting ability of their blood. In other words, the animals do not directly die from the poisonous effect of the chemical, but rather from its consequences, in that their blood fails to have the clotting ability, and progressive hemorrhaging sets up within their intestinal tract so that the animals gradually become weaker and weaker until they finally die. For this procedure to take place, a time element of from five to fourteen days approximately is required to cause the individual animal such as a mouse or rat to die. That means that these animals have to return again and again to the dispenser to keep up the supply of the material which is causing their condition leading to their death.

The chemical indicated will kill any mammal or fowl taken in sufficient concentration over a sufficiently long period of time, but the material is in such small concentration in the bait required to kill rats and mice, that it is extremely unlikely that farm animals, dogs and cats, will be harmed from occasional exposures to or to the eating of the bait. However, the structure embodying the invention is designed to prevent any accidental exposure to the bait such as might occur by upsetting of the usual bait dispenser heretofore employed, so that there will be no opportunity for the "build up" effect of the bait to occur in any animal accidentally obtaining access thereto.

Therefore the invention herein shown and described is especially designed as above indicated to not only dispense the bait in accordance with the catering to the desires of the animals, but also to prevent accidental exposure of the bait to other animals, that is animals which are not intended to be killed and which cannot enter the confines of the dispenser.

A further primary object of the invention is to provide a dispenser which may be used out of doors as well as in doors and which will keep the bait dry in either exposure. Further objects of the invention reside in the structure permitting the bait to be readily placed in a dispenser, in a structure which may be produced at a relatively low cost, and an inner structure which will be enduring over a long period of time. These and other objects and advantages of the invention will become apparent in the following description of the one particular form of the invention as described and illustrated by the accompanying drawing, in which—

Figure 2:
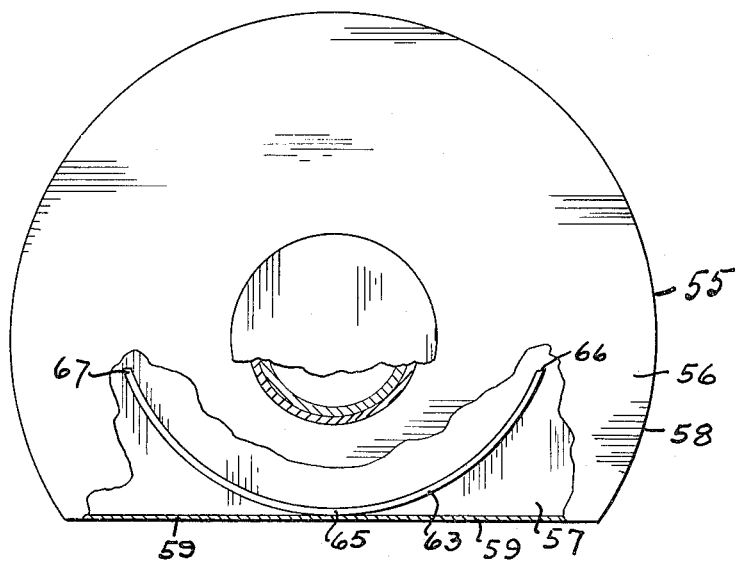
Fig. 2 is a view in top plan and partial section of the structure.

A housing 55 is provided to have an upper ceiling 56, a lower floor 57, and an encircling side wall 58 cylindrical in shape through a major circumferential length thereof, terminating in a chordal planar wall 59. The chordal or planar wall 59 is provided with two entry holes 60 and 61 therethrough, these holes being spaced toward the outer ends of that wall 59.

A threaded tubular member 62 in a form herein shown, is fixed by an upper end to the top ceiling 56, centered on a line extending across the ceiling 56 perpendicular to and centrally of the wall 59. The tube 62 is located to be a slight distance inwardly from the planar wall 59.

The neck or mouthpiece 32 of the bait receiving receptacle 33 carrying a gasket 35 therearound adjacent the annular external rib 34, is screw-threaded down into the tube 62 from the top side of the ceiling 56 to form a secure and substantially water-tight engagement therewith. The container 33 is in the nature of the ordinary Mason jar.

Figure 1:
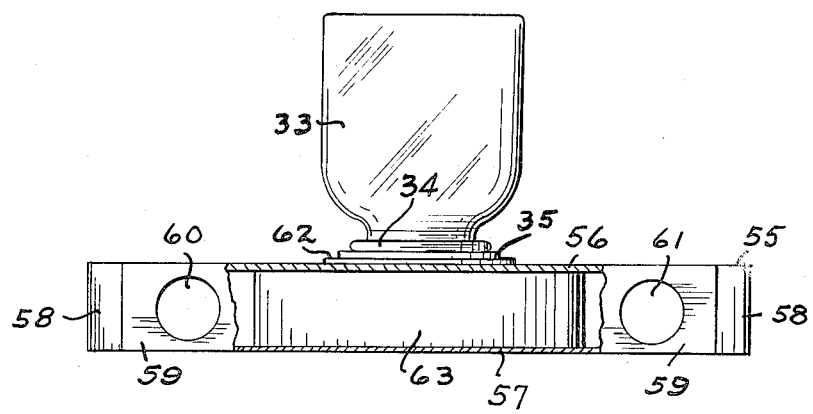
Fig. 1 is a view in entrance side elevation and partial section of a structure embodying the invention.

The lower end of the tube 62 is spaced above the floor 57 a sufficient distance to permit the bait carried in the receptacle 33 to feed downwardly thereon and slightly radially outwardly therefrom. The receptacle 33 is unscrewed from the member 32 and turned upwardly to receive the bait, whereupon the housing 55 is placed over that end 32 and screw-threadedly engaged therewith, whereupon the receptacle 33 is inverted as illustrated in Figs. 1 and 3 to allow that bait to feed downwardly to the floor 57.

Figure 3:
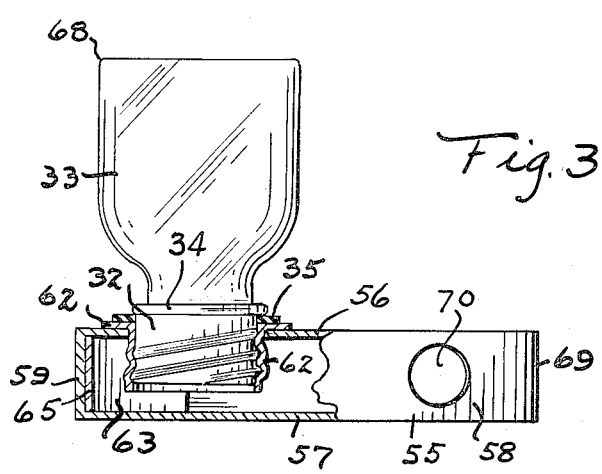
Fig. 3 is a view in side elevation and partial section of the structure.

A baffle member 63, herein shown as being arcuate in nature, is secured by its central zone to the inside of the planar wall 59 this zone being indicated by the numeral 65, Fig. 2 and Fig. 3. This zone 65 is spaced centrally of the wall 59 between its outer end junctions with the curved wall 58. The baffle 63 extends inwardly between the floor 57 and the ceiling 56, completely filling the space therebetween, and curves around in an arcuate manner as indicated in Fig. 2 to have its ends 66 and 67 spaced a considerable distance inwardly from the wall 59, and forming approximately an equal cross-sectional space between the baffle 63 and the wall 58 from the holes 60 and 61 back into the housing 55 to the terminal ends 66 and 67. These terminal ends 66 and 67 are so located that a rodent within the housing 55 back of the tube 62 cannot be observed through either hole 60 or 61 so that the rodent feels the effect of privacy and safety while eating.

While the floor 57 herein serves as a bait feeding zone around the lower end of tube 62, it also in conjunction with the planar wall 57 and the curved baffle 63 prevents spilling of the bait from that zone around the tube 62 outwardly through the holes 60 and 61 when the entire housing 55 with its carried receptacle 33 may be turned over. By reason of the presence of the flat wall 59 located along that side of the housing 55 immediately adjacent the tube 62 with the receptacle 33 extending directly thereabove, the entire assembly will come to rest when turned over on that flat wall 59 and the outer or relatively uppermost corner 68 of the receptacle 33 as indicated in Fig. 3. The diameter of the wall 58 is such that it would be extremely difficult for the device to remain in a position wherein the side 69 Fig. 3, would remain on the ground or floor in the overturned position. In any event should such a possibility occur, then the bait within the housing 55 would drop down internally thereof to that side 69 without in any way spilling out through the holes 60 and 61. However as above indicated, the entire design is so constructed and balanced that the housing will come to rest in the overturned position on the flat side 59.

In coming to rest on that side, it is to be observed that the baffle 63 will most effectively retain the bait which has dropped out of the lower end of the tube 62 and thereby prevent that bait from sliding or falling out either one of the holes 60 and 61.

Even if there is a hole 70 Fig. 3, for the entrance of rodents through the arcuate wall 58, still the bait will not spill out onto the floor or ground through that hole 70 when the device is resting on the flat wall 59 and the corner 68 of the receptacle 33. The flat side of the wall insures that the dispenser will always come to rest on that flat side when the device is upset.

Therefore it is to be seen that the structure embodying my invention presents a "safety" dispenser by reason of the peculiar association of the elements as above set out, and while I have described the dispenser in the one particular form in detail, it is obvious that structural changes may be employed without departing from the spirit of the invention, and I therefore do not desire to be limited to that precise form beyond the limitations which may be imposed by the following claims.

I claim:

1. A rodenticide dispenser comprising a housing defined by a ceiling, a floor, and an enclosing wall extending entirely around and between said ceiling and floor; said wall being generally cylindrical in shape throughout a major circumferential length merging into a minor planar length, and having an entry hole toward one end of the planar length; a rodenticide container mounted at one side of the housing adjacent to said planar wall side thereof, said container extending a distance above said ceiling and also a distance by an open end portion therebelow to terminate a relatively short distance above said floor; and a baffle member within the housing extending from floor to ceiling and from said planar wall inwardly a distance in spaced relation between said container end portion and said cylindrical wall defining an entry way shielding that container end portion, and into which entry way said hole opens.

2. The structure of claim 1 in which said baffle terminates by a free end forming between that end and said planar wall a rodenticide retainer adapted to prevent spillage of the rodenticide through said hole upon upsetting of the housing onto its planar side.

3. The structure of claim 1 in which said baffle extends approximately a quarter of the way around said container end portion.

4. A rodenticide dispenser comprising a housing having a flat side wall section and the remainder of the side wall bulging outwardly generally cylindrically from ends of the flat section; said housing having a closed ceiling and floor; a rodenticide dispenser extending through the ceiling adjacent said flat wall section and within the housing to terminate by an open end in spaced relation from the floor; and an arcuate baffle extending from a central zone of said flat wall section and around said container end in spaced relation therefrom, and terminating by ends spaced from both said cylindrical wall and said flat wall section; said flat section having a pair of holes therethrough, each spaced approximately equally from said zone, presenting openings into the housing between said baffle and said cylindrical wall section on each side of the container end.

5. The structure of claim 4 in which said baffle ends are positioned to close off view of said container end through either of said holes.

6. A non-spilling rodenticide dispenser comprising a housing having a generally round side wall with a flat side, a ceiling and a floor; a rodenticide container carried by the housing closed externally of the housing and having an open discharging end within the housing directed toward the floor thereof; said flat side having a rodent entry hole through and to one side thereof; and baffle means between said ceiling and floor interposed between said container end and said entry hole thereby withholding the rodenticide flowing from said container end against spillage through said hole upon turning over the housing.

7. A rodenticide dispenser, non-spilling upon upsetting, comprising a closed housing; a rodenticide dispenser discharging into the housing and located to one side thereof; said side being flat and having a rodent entry hole; and means within the housing arresting rodenticide flow across the housing to said hole upon upsetting of the housing.

8. A non-spilling rodenticide dispenser comprising a housing having a generally round side wall with a flat side, a ceiling and a floor; and a rodenticide container carried by the housing closed externally of the housing and having an open discharging end within the housing directed toward the floor thereof; said wall having a rodent entry hole therethrough; and said dispenser coming to rest on the flat side and a corner of said container upon turning over of the dispenser.

References Cited in the file of this patent

UNITED STATES PATENTS 2,480,724    Feussner    Aug. 30, 1949

FOREIGN PATENTS 15,044    Great Britain    1895